(12) United States Patent
Byrne et al.

(10) Patent No.: US 10,673,191 B2
(45) Date of Patent: Jun. 2, 2020

(54) ELECTRICAL POWER UNIT WITH WIRELESS CHARGING

(71) Applicants: Norman R. Byrne, Ada, MI (US); Nickolas J. Morrow, Ada, MI (US)

(72) Inventors: Norman R. Byrne, Ada, MI (US); Nickolas J. Morrow, Ada, MI (US)

(*) Notice: Subject to any disclaimer, the term of this patent is extended or adjusted under 35 U.S.C. 154(b) by 199 days.

(21) Appl. No.: 15/581,290

(22) Filed: Apr. 28, 2017

(65) Prior Publication Data

US 2017/0317458 A1 Nov. 2, 2017

Related U.S. Application Data

(60) Provisional application No. 62/330,712, filed on May 2, 2016.

(51) Int. Cl.
| | |
|---|---|
| *H01R 13/447* | (2006.01) |
| *H01R 27/02* | (2006.01) |
| *H02J 7/00* | (2006.01) |
| *H01R 25/00* | (2006.01) |
| *H02J 50/90* | (2016.01) |
| *H02J 50/12* | (2016.01) |
| *H02J 50/40* | (2016.01) |
| *H01R 13/717* | (2006.01) |
| *H02J 7/02* | (2016.01) |
| *H01R 13/66* | (2006.01) |

(52) U.S. Cl.
CPC .......... *H01R 27/02* (2013.01); *H01R 13/447* (2013.01); *H01R 13/717* (2013.01); *H01R 25/006* (2013.01); *H02J 7/0044* (2013.01); *H02J 7/025* (2013.01); *H02J 50/12* (2016.02); *H02J 50/40* (2016.02); *H02J 50/90* (2016.02); *H01R 13/6675* (2013.01); *H01R 13/7175* (2013.01)

(58) Field of Classification Search
CPC .......... H04B 5/00; H02J 50/00; H01R 13/477
USPC .............................. 307/104; 220/3.2, 3.7, 3.8
See application file for complete search history.

(56) References Cited

U.S. PATENT DOCUMENTS

| | | | |
|---|---|---|---|
| 4,372,629 A | 2/1983 | Propst et al. | |
| 4,551,577 A | 11/1985 | Byrne | |
| 4,747,788 A | 5/1988 | Byrne | |
| 4,984,982 A * | 1/1991 | Brownlie | G02B 6/4451 174/490 |
| 5,575,668 A * | 11/1996 | Timmerman | A47B 21/06 174/482 |
| 5,709,156 A | 1/1998 | Gavaert et al. | |

(Continued)

*Primary Examiner* — Adi Amrany
(74) *Attorney, Agent, or Firm* — Gardner, Linn, Burkhart & Ondersma LLP (57) ABSTRACT

An electrical power unit is positionable in or along a work surface and includes a housing with a movable cover that is positionable in open and closed positions at an upper region of the housing. The cover defines an interior region in which a wireless power transmitter is mounted. A lamp unit is disposed in the housing or the cover. The lamp unit is configured so that emitted light is visible from outside the power unit when the cover is closed. The wireless power transmitter is operable to selectively illuminate the lamp unit when the wireless power transmitter is energized. Optionally, at least one direct-contact electrical or data receptacle is provided at the housing, and may be arranged or positioned so that it is accessible at least when the cover is in the open position.

19 Claims, 9 Drawing Sheets

(56) References Cited

U.S. PATENT DOCUMENTS

| | | | | |
|---|---|---|---|---|
| 5,980,279 | A * | 11/1999 | Muller | A47B 21/06 174/489 |
| 6,046,405 | A * | 4/2000 | Obermann | H02G 3/185 174/17 CT |
| 6,290,518 | B1 | 9/2001 | Byrne | |
| 6,979,209 | B2 * | 12/2005 | Griepentrog | H01R 13/447 439/131 |
| 7,633,263 | B2 * | 12/2009 | Toya | H02J 50/10 320/108 |
| 7,674,119 | B1 * | 3/2010 | McCarthy | A47B 21/00 439/131 |
| 7,736,178 | B2 | 6/2010 | Byrne | |
| D639,244 | S * | 6/2011 | Byrne | D13/139.4 |
| 8,262,244 | B2 | 9/2012 | Metcalf et al. | |
| 8,287,292 | B2 * | 10/2012 | Byrne | H02G 3/185 439/131 |
| 8,395,353 | B2 | 3/2013 | Wang et al. | |
| 8,616,921 | B2 | 12/2013 | Byrne et al. | |
| 8,690,590 | B2 * | 4/2014 | Byrne | H05K 5/03 439/131 |
| 8,944,266 | B2 * | 2/2015 | Roemer | H02G 3/185 174/76 |
| 8,951,054 | B2 * | 2/2015 | Byrne | H01R 35/04 307/104 |
| 9,312,673 | B2 | 4/2016 | Byrne et al. | |
| 9,438,070 | B2 * | 9/2016 | Byrne | H02J 5/005 |
| 10,050,473 | B2 | 9/2018 | Byrne et al. | |
| 10,116,094 | B2 | 10/2018 | Byrne et al. | |
| 2004/0026998 | A1 | 2/2004 | Henriott et al. | |
| 2005/0068019 | A1 * | 3/2005 | Nakamura | G06F 1/26 323/355 |
| 2008/0121147 | A1 * | 5/2008 | Cooke | A47B 21/06 108/50.02 |
| 2008/0200050 | A1 | 8/2008 | Byrne | |
| 2009/0072784 | A1 * | 3/2009 | Erickson | H02J 7/0027 320/108 |
| 2009/0096413 | A1 * | 4/2009 | Partovi | H01F 5/003 320/108 |
| 2009/0212638 | A1 | 8/2009 | Johnson | |
| 2009/0278494 | A1 | 11/2009 | Randall | |
| 2010/0290215 | A1 | 11/2010 | Metcalf et al. | |
| 2012/0170292 | A1 * | 7/2012 | Bhosale | H01R 13/6658 362/415 |
| 2013/0207478 | A1 | 8/2013 | Metcalf et al. | |
| 2015/0050881 | A1 * | 2/2015 | Chen | H04W 52/0296 455/41.1 |
| 2015/0091522 | A1 * | 4/2015 | Byrne | H02J 5/005 320/108 |
| 2015/0097519 | A1 * | 4/2015 | Chen | H02J 7/025 320/108 |
| 2015/0249343 | A1 | 9/2015 | Makwinski et al. | |
| 2016/0022030 | A1 * | 1/2016 | Scott | A47B 21/06 108/25 |
| 2016/0025316 | A1 * | 1/2016 | Chien | F21V 23/023 362/253 |
| 2016/0153650 | A1 * | 6/2016 | Chien | F21V 33/0004 362/253 |
| 2016/0204644 | A1 * | 7/2016 | Dukerschein | H02J 7/0047 320/108 |
| 2016/0233711 | A1 * | 8/2016 | Miller | H02J 7/0054 |
| 2017/0156490 | A1 * | 6/2017 | Newhouse | A47B 21/06 |
| 2017/0177031 | A1 | 6/2017 | Lesizza et al. | |
| 2017/0224103 | A1 * | 8/2017 | Newhouse | H02G 3/18 |
| 2017/0258246 | A1 | 9/2017 | Schwalbach et al. | |
| 2017/0264129 | A1 * | 9/2017 | Pitchford | H02J 7/025 |
| 2017/0317533 | A1 * | 11/2017 | Byrne | H02J 50/12 |
| 2019/0237922 | A1 * | 8/2019 | Zhu | H01R 13/24 |

* cited by examiner

ELECTRICAL POWER UNIT WITH WIRELESS CHARGING

CROSS-REFERENCE TO RELATED APPLICATION

The present application claims the filing benefits of U.S. provisional application, Ser. No. 62/330,712, filed May 2, 2016, which is hereby incorporated herein by reference in its entirety.

FIELD OF THE INVENTION

The present invention relates to electrical power and/or data systems with wireless electrical charging capabilities for use in work areas and the like.

BACKGROUND OF THE INVENTION

Electrical power and/or data systems are commonly provided in work areas, such as at or in work tables and desks, conference tables, work area dividers, and the like. Such systems typically provide one or more high voltage AC power outlets, and in some cases provide one or more low voltage DC power outlets and/or electronic data or communications receptacles, or various combinations of these. In addition, various types of wireless power transmission technologies are generally available, ranging from pads having strips of electrical conductors of different polarities for direct contact by respective conductors associated with an electrical consumer, to non-contact technologies such as resonant inductive coupling (magnetic field resonance) and electric field resonant capacitive coupling.

SUMMARY OF THE INVENTION

The present invention provides an electrical power unit that is positionable in or along a work surface, and which has wireless power transmission capability. Optionally, active and/or passive indicia are provided as an aid to users who wish to place portable electronic devices at or near the unit for charging. The power unit includes a housing with a movable cover at an upper region of the housing, the cover being positionable at open and closed positions. The cover defines an interior region in which a wireless power transmitter is mounted. A lamp unit is disposed in the housing or the cover. The lamp unit is configured so that emitted light is visible from outside the power unit when the cover is closed. The wireless power transmitter is operable to selectively illuminate the lamp unit when the wireless power transmitter is energized. The wireless power transmitter may have proximity sensing capability so that it will only energize when a compatible wireless power receiver is detected or sensed as being within charging range of the wireless power transmitter. Optionally, at least one direct-contact electrical or data receptacle is provided at the housing, and may be arranged or positioned so that it is accessible at least when the cover is in the open position.

According to one form of the present invention, an electrical power unit is configured to be positioned along a work surface and includes a housing, a cover coupled to an upper region of the housing, at least one electrical or data receptacle, a wireless power transmitter, and a lamp unit. The cover is movable from a closed position to an open position, has a rear portion and a front portion opposite the rear portion, and is hollow to define a cover interior. The electrical or data receptacle(s) are supported at the housing and positioned below the cover, and are accessible when the cover is in the open position. The wireless power transmitter is positioned in the cover interior and directs wireless electrical power through an upper surface of the cover in order to charge a portable electronic device positioned atop the cover. The lamp unit is positioned in the housing or the cover, and is arranged so that light emitted from the lamp unit is visible from outside the electrical power unit when the cover is closed. The lamp unit illuminates when the wireless power transmitter is energized, thus providing visual confirmation to a user that wireless power is available at the electrical power unit.

In one aspect, the electrical or data receptacle includes at least one direct-contact high voltage AC receptacle and at least one low voltage DC receptacle.

In another aspect, the rear portion of the cover is pivotably coupled to the housing, so that the cover is pivotably movable from the closed position to the open position.

In a further aspect, the lamp unit is located in the interior region at the front portion of the cover. Optionally, the front portion of the cover includes an aperture or translucent region through which the lamp unit is visible when illuminated.

In yet another aspect, the housing has an upper front region arranged so that when the front portion of the cover is in the closed position, the front portion of the cover is spaced from the upper front region of the housing to define an elongate slot. The elongate slot may provide cord access to the electrical or data receptacle when the cover is closed, and may also facilitate viewing light emanating from the lamp unit.

In a still further aspect, the wireless power transmitter is operable to detect when a compatible power receiver is positioned within transmission range of the wireless power transmitter, and the lamp unit is illuminated only when the compatible power receiver is positioned within the transmission range of the wireless power transmitter. Optionally, the wireless power transmitter is a contactless power transmitter.

Optionally, at least two of the wireless power transmitters are mounted in spaced arrangement in the cover interior, with at least two lamp units corresponding to respective wireless power transmitters. Optionally, the wireless power transmitters are independently energizable.

In still another aspect, the housing defines a cavity below the cover, wherein the electrical or data receptacle(s) are accessible in the cavity at least when the cover is in the open position.

According to another form of the present invention, an electrical power unit is configured to be positioned along a work surface and includes a housing defining an interior cavity, a cover pivotably coupled to an upper region of the housing, a wireless power transmitter, and a lamp unit associated with the wireless power transmitter. The cover has upper and lower panels or surfaces that cooperate to define a cover interior, the cover further having a front edge portion spaced from the housing to define an elongate gap that provides access to the interior cavity. The wireless power transmitter is positioned in the cover interior and directs contactless electrical power through the upper surface of the cover. The lamp unit is positioned in the front edge portion of the cover, so that light emitted from the lamp unit is directed outwardly through the elongate gap. The lamp is selectively illuminated when the wireless power transmitter is energized.

In one aspect, the power unit further includes at least one electrical or data receptacle supported at the housing and accessible via the interior cavity. Optionally, the at least one electrical or data receptacle includes at least one direct-contact high voltage AC receptacle and at least one low voltage DC receptacle.

In another aspect, the electrical power unit includes at least two of the wireless power transmitters that are are operable to independently detect when a compatible power receiver is positioned within transmission range. The wireless power transmitters are configured to illuminate respective lamp units only when the compatible power receiver is positioned within the transmission range of a respective wireless power transmitter.

In still another form of the present invention, an electrical power unit is configured to be positioned along a work surface and includes a housing, a carriage, at least one electrical or data receptacle, a cover mounted in an open upper region of the housing, a plurality of wireless power transmitters, a plurality of lamp units in communication with respective wireless power transmitters, and a power supply and voltage converter supported at the carriage. The housing defines an interior cavity that is selectively covered and exposed by the cover, which is pivotable between opened and closed positions. The cover has an upper panel and a lower panel spaced below the upper panel, the panels cooperating to define a cover interior. The cover has a front edge portion in which a plurality of lamp units are mounted in spaced arrangement. The carriage is mounted in a lower region of the housing, below the cover and the open upper region of the housing. The at least one electrical or data receptacle is supported at the carriage and is accessible via the interior cavity. The wireless power transmitters are positioned in spaced arrangement in the cover interior and are configured to direct contactless electrical power upwardly through the upper panel of the cover, for energizing or charging portable electronic devices positioned atop or above the cover. The power supply and voltage converter are supported at the carriage, supply electrical power received from a power infeed to each of the wireless power transmitters. The lamp units are in electrical communication with respective wireless power transmitters, and illuminate independently when respective ones of the wireless power transmitters are energized, so that light emitted from each of the lamp units is directed outwardly from the open upper region of the housing.

In one aspect, each of the wireless power transmitters is configured to detect when a compatible power receiver is positioned within transmission range, and each of the wireless power transmitters is configured to illuminate a respective lamp unit only when the compatible power receiver is positioned within the transmission range of that wireless power transmitter.

In another aspect, the front edge portion of the cover is spaced from a surface of the housing that defines a portion of the open upper region, thereby defining an elongate gap between the front edge of the cover and the housing to provide cord access to the interior cavity when the cover is closed.

In a further aspect, the front edge portion of the cover includes a forward cover sidewall extending upwardly from a forward edge of the bottom panel, with the forward cover sidewall defining a plurality of openings corresponding to respective lamp units.

In a still further aspect, the cover includes a central structural cover portion disposed in the cover interior between the upper and lower panels, with the central structural cover portion defining a plurality of openings in spaced arrangement, each of the openings sized and shaped to receive a respective one of the wireless power transmitters.

Therefore, the electrical power unit of the present invention provides convenient access to conventional direct-contact power and/or data outlets along a work surface such as a table or desk, while also providing convenient wireless charging for compatible portable electronic devices such as mobile phones, hand-held media players, tablet computers, and the like. The electrical power unit provides a visual indication, via one or more illuminating lamps, that a given wireless power transmitter is electrically energized, which may coincide with a portable electronic device receiving power from that transmitter. A movable cover or lid contains the one or more wireless power transmitters, and the cover or lid can be raised to provide access to an interior of the electrical power unit, such as for plugging other devices into the direct-contact power and/or data outlets. The lamps may be directly visible to users within a vicinity of the electrical power unit, or the lamps may illuminate or directs light onto a surface of the electrical power unit that is visible to a user, even when the power unit's cover is closed.

These and other objects, advantages, purposes and features of the present invention will become apparent upon review of the following specification in conjunction with the drawings.

DESCRIPTION OF THE PREFERRED EMBODIMENTS

Figure 1:
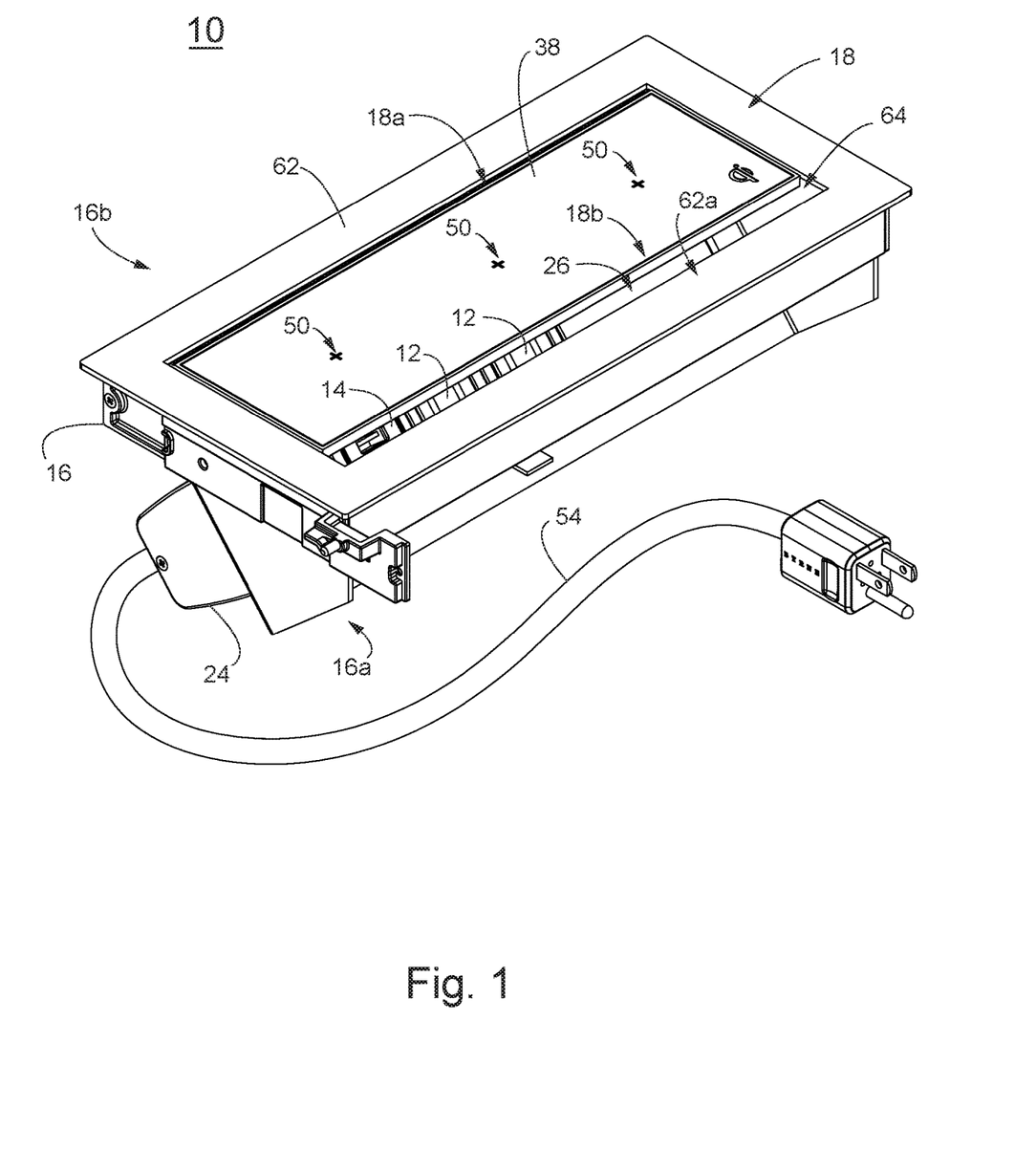
FIG. 1 is a top perspective view of an electrical power unit incorporating wireless charging units in accordance with the present invention, in which the cover is closed.
Figure 2:
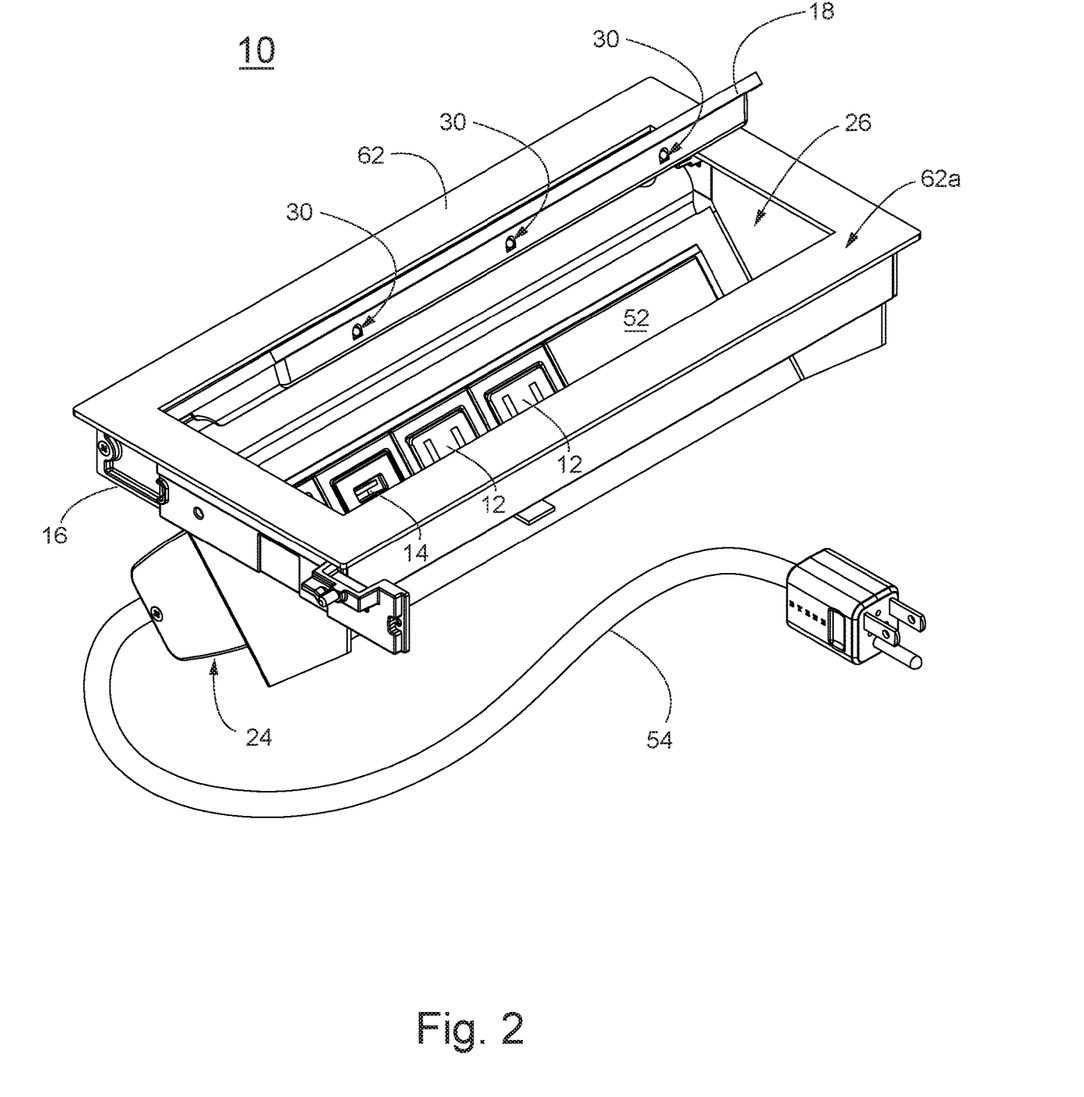
FIG. 2 is another perspective view of the electrical power unit of FIG. 1, in which the cover is moved to an open position.
Figure 9:
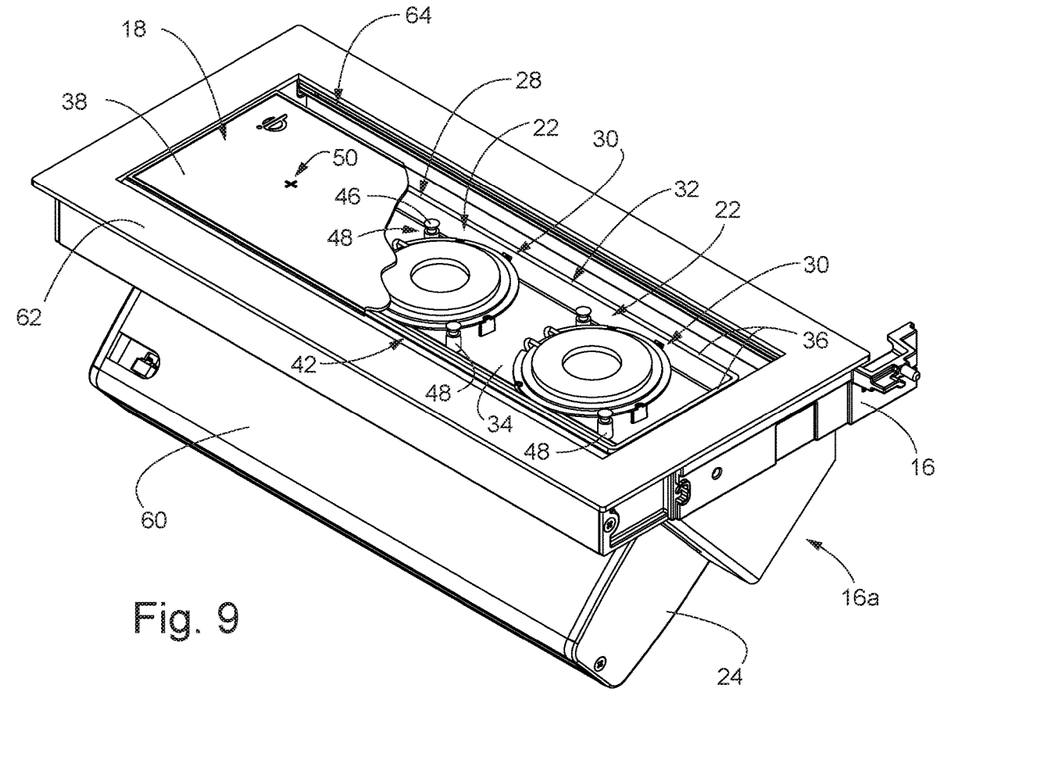
FIG. 9 is a top rear perspective view of the electrical power unit of FIG. 1, with a portion of the cover's top panel cut away and a structural cover portion removed to reveal internal structure.
Figure 10A:
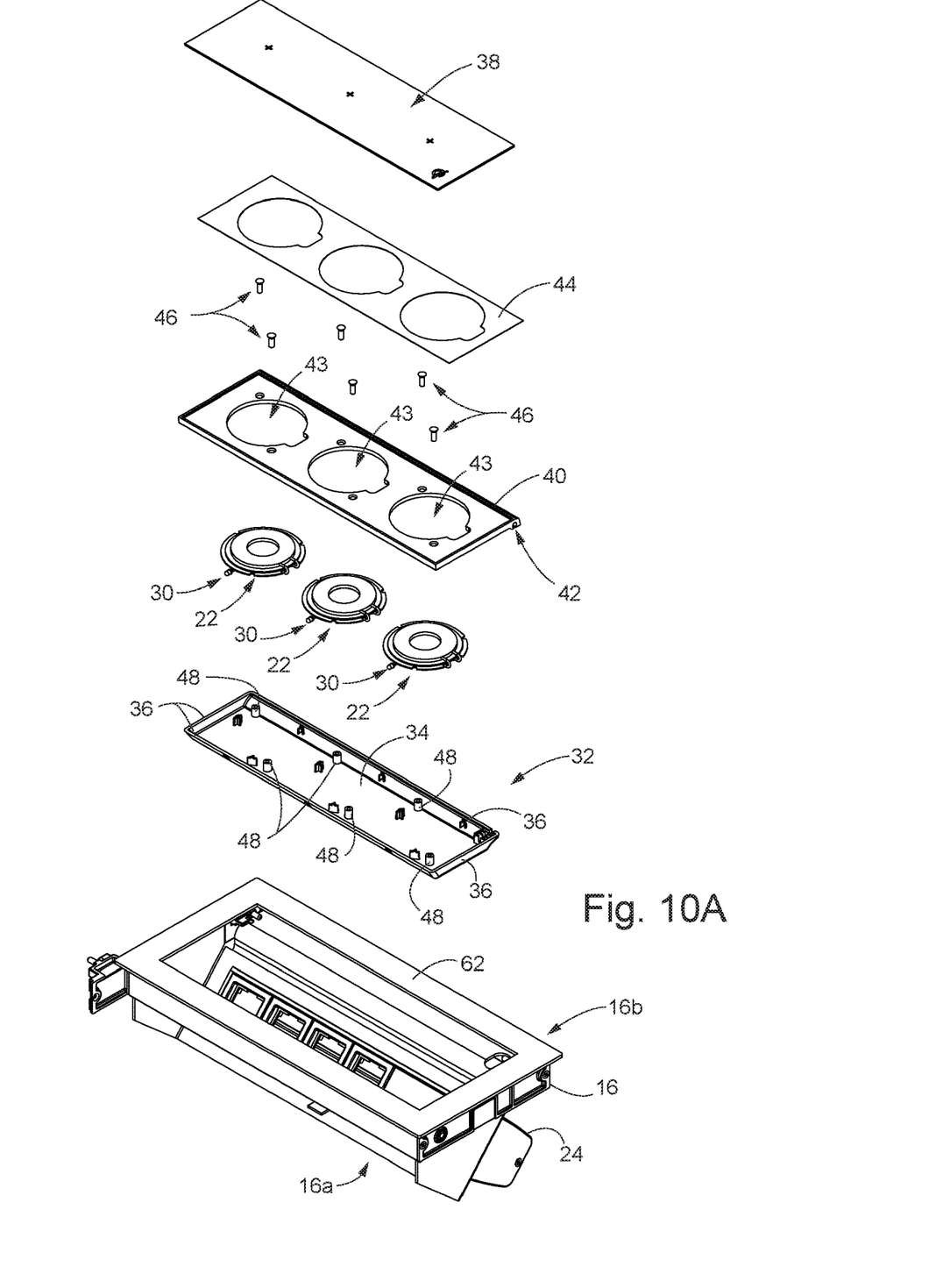
FIGS. 10A and 10B are exploded top and bottom perspective views of the cover portion shown positioned above the housing and carriage of the electrical power unit.

Referring now to the drawings and the illustrative embodiments depicted therein, a power and/or data unit with wireless charging capability 10 provides electrical power via direct connections at traditional electrical receptacles 12, 14 in a recessed area of a housing 16, such as shown in FIGS. 1 and 2. Power and/or data unit 10 also provides wireless charging at a pivotable lid or cover 18 when a portable electronic device 20 (FIGS. 3, 4, 7A and 7B) that is fitted with compatible power receiving technology is placed within range of one of a plurality of wireless power transmitters 22 (FIGS. 6-10) incorporated into the cover 18. Although it is envisioned that high voltage AC receptacles 12 and/or low voltage DC receptacles 14, or electronic data or signal connectors or receptacles (not shown) may be supported by a carriage 24 at a lower region 16a of housing 16 and accessed through a recess or cavity 26 below cover 18, such as shown in FIGS. 1 and 2, this is not required and the electrical charging capabilities of the power unit 10 may be limited to wireless power transmitters 22 and associated wiring and circuitry, such as shown in FIG. 10A.

Figures 3, 4:
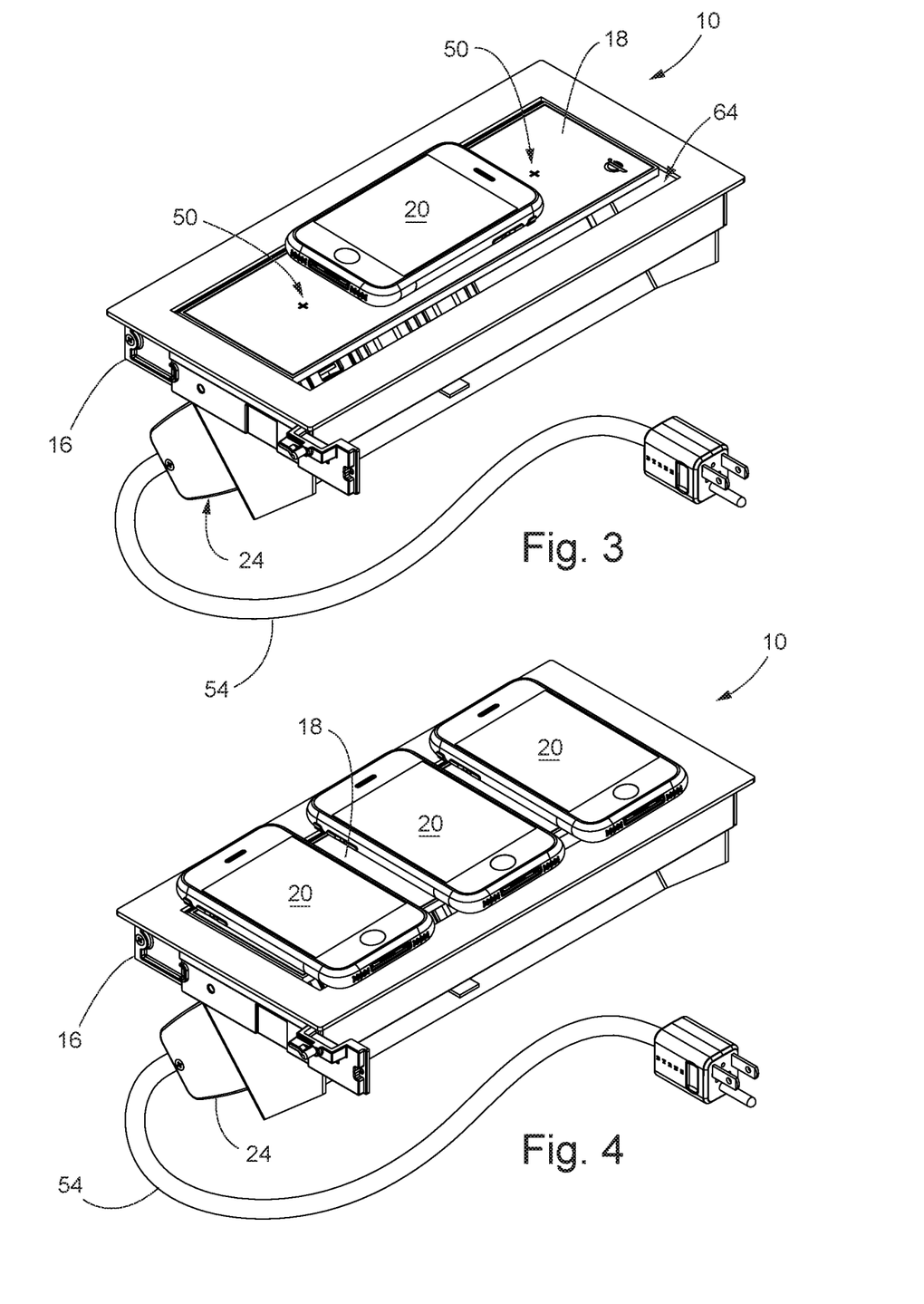
FIG. 3 is another perspective view of the electrical power unit of FIG. 1, in which a single portable electronic device is positioned atop the closed cover for wireless charging.
FIG. 4 is another perspective view of the electrical power unit of FIG. 1, in which three portable electronic devices are positioned atop the closed cover for simultaneous wireless charging.
Figure 5:
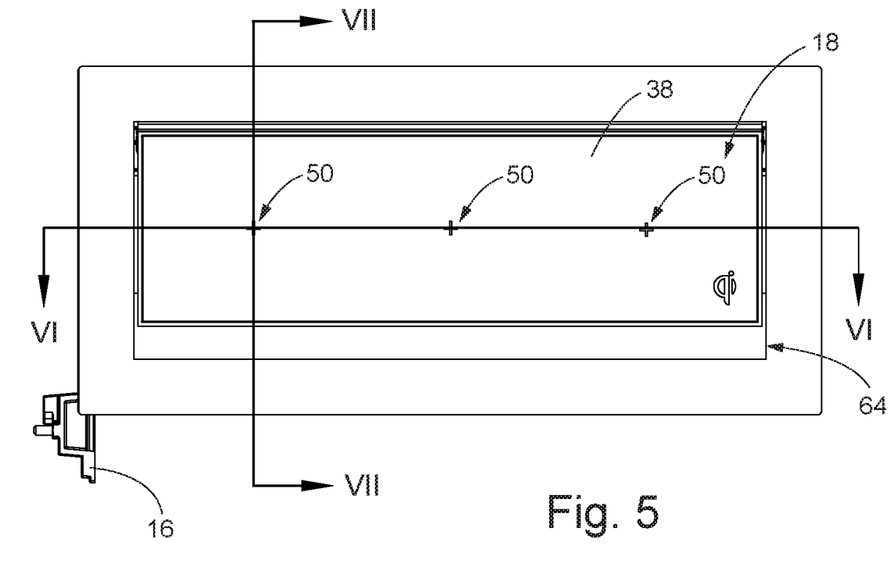
FIG. 5 is a top plan view of the electrical power unit of FIG. 1.
Figure 6:
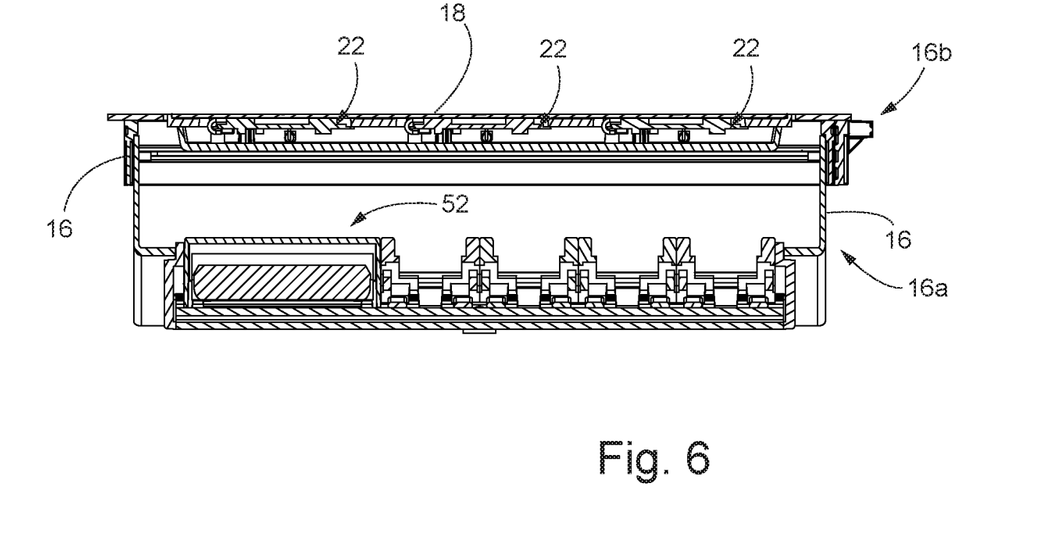
FIG. 6 is a sectional elevation taken along section line VI-VI in FIG. 5.
Figure 7A:
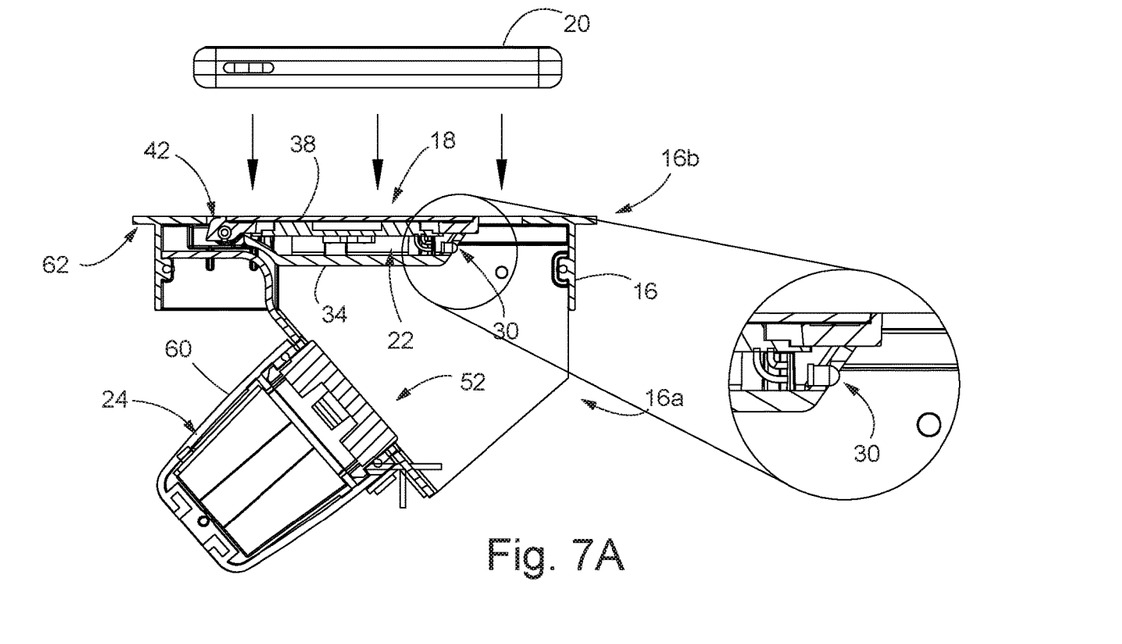
FIGS. 7A and 7B are sectional elevations taken along section line VII-VII in FIG. 5, including an enlarged view of a forward edge region of the cover, and depicting placement of a portable electronic device atop the cover for charging.
Figure 7B:
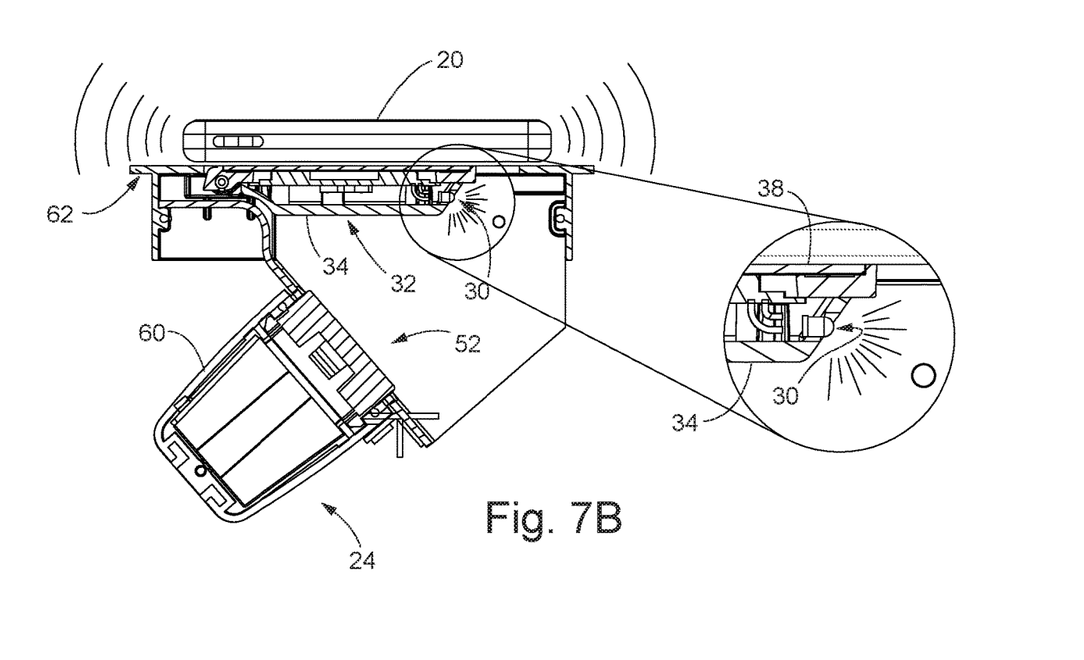
Figure 8:
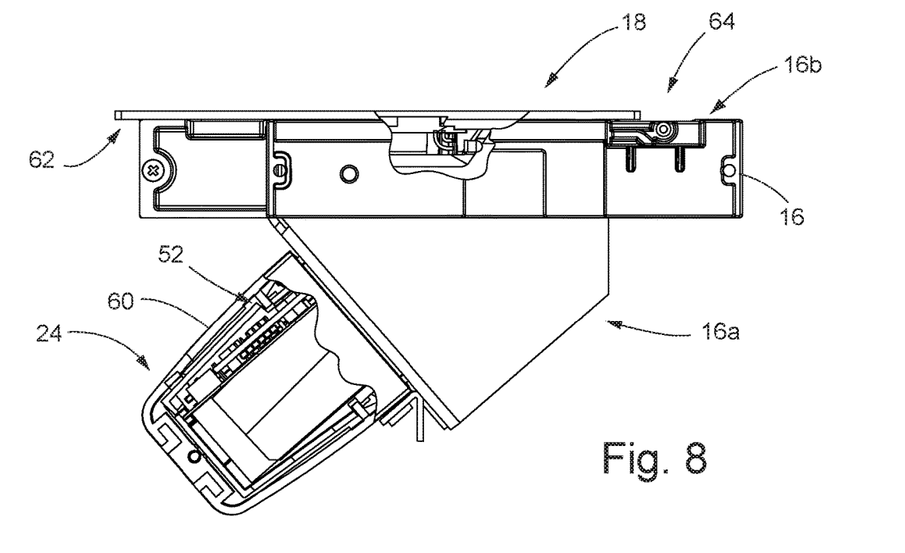
FIG. 8 is a right side elevation of the electrical power unit of FIG. 1, with portions cut away to reveal internal structure.

Cover 18 is pivotably coupled to an upper region 16b of housing 16, the cover defining an interior region 28 (FIG. 9) and having a rear portion 18a and a front portion 18b opposite the rear portion 18a. Cover 18 is movable from a closed position (FIGS. 1 and 3-8) to an open position (FIG. 2) in which the electrical receptacles 12, 14 are accessible in the cavity 26 formed by housing 16. In the illustrated embodiment, three wireless power transmitters 22 are positioned in the interior region 28 of cover 18. Each wireless power transmitter 22 has an associated lamp unit 30 that is positioned at the front portion 18b of cover 18 and is operable to emit light that can be viewed from outside the power unit 10 when cover 18 is in the closed position, such as shown in FIG. 7B. Each wireless power transmitter 22 is operable to selectively and independently illuminate its corresponding lamp unit 30, thus providing an active indicia to nearby persons when the wireless power transmitter is energized, such as shown in FIG. 3. The front portion 18b of the cover 18 includes apertures 31 (FIG. 10B) or translucent regions through which light passes from the lamp units 30 into the surrounding area.

Wireless power transmitters 22 may utilize substantially any wireless power transmission technology, such as resonant inductive coupling (magnetic field resonance) or electric field resonant capacitive coupling. For example, power transmitters 22 may meet Qi® wireless charging protocols for resonant inductive couplings. In the illustrated embodiment, three power transmitters 22 are operable to independently detect when a compatible power receiver (such as a power receiver associated with a Qi® compatible portable electronic device 20) is positioned within transmission range of the wireless power transmitter 22, such as shown in FIGS. 7A and 7B. Substantially any transmission range is envisioned, such as up to at least about 1.0 to 1.6 inches, although it will be appreciated that greater transmission ranges are possible with current technologies, including electric field resonant capacitive coupling technologies. Thus, it may be possible to charge a portable electronic device 20 using wireless power transmitters 22 even when there is a book or notepad disposed therebetween.

It will be appreciated that substantially any number of wireless power transmitters 22 may be provided at a given electrical power unit, depending on the size of the power unit, the size of the transmitters 22, possible limitations on incoming electrical power, and the type of wireless power transmission technology embodied by a given transmitter, for example. Where multiple wireless power transmitters 22 are provided, these may provide different wireless power transmission technologies so that portable electronic devices having different wireless power receivers may be charged simultaneously, and to make a given electrical power unit compatible with more than one type of portable electronic device.

Each wireless power transmitter 22 is configured to illuminate its respective lamp unit 30 only when the compatible power receiver or device 20 is positioned within transmission range. This provides users with a readily discernible visual indication that their portable electronic device 20 has established a power transmission coupling with a particular transmitter 22 and is actively receiving power. It is envisioned that the portable electronic device 20 may itself provide a visual or audible indication when power is being received, such as shown in FIG. 7B.

Figure 10B:
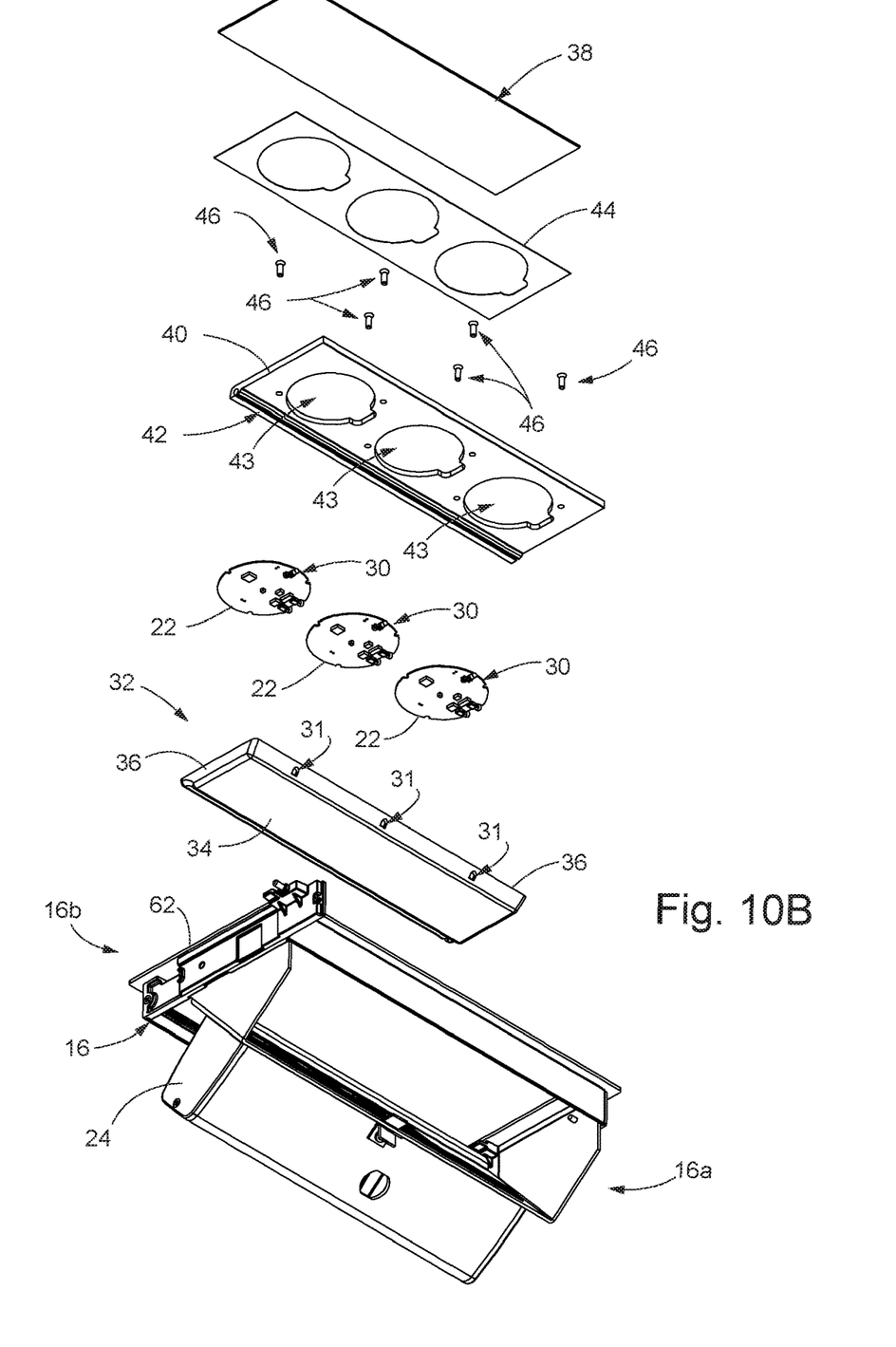

Cover 18 includes a shallow tub-shaped tray bottom 32 having a generally planar base panel 34 and upwardly-extending sidewalls 36 that are engaged by an upper generally planar top panel 38, all of which surround a central structural cover portion 40, such as shown in FIGS. 10A and 10B. Structural cover portion 40 includes a hinge region 42 and a plurality of openings 43 for receiving and supporting respective wireless transmitters 22. A double-sided adhesive sheet 44 is provided for securing top panel 38 to an upper surface of structural cover portion 40, which in turn is secured to tray bottom 32 by a plurality of threaded fasteners 46 that extend through respective bores formed in structural cover portion 40 and threadedly engage respective screw bosses 48 that extend upwardly from base panel 34 of tray bottom 32 (FIGS. 9 and 10A). Optionally, the cover's top panel 38 includes passive (e.g., non-illuminating) markings or indicia 50 that provide users with a visual indication of the center of each wireless power transmitter 22, to aid a user with the alignment of one or more of the portable electronic devices 20 such as shown in FIGS. 3 and 4.

Figure 11:
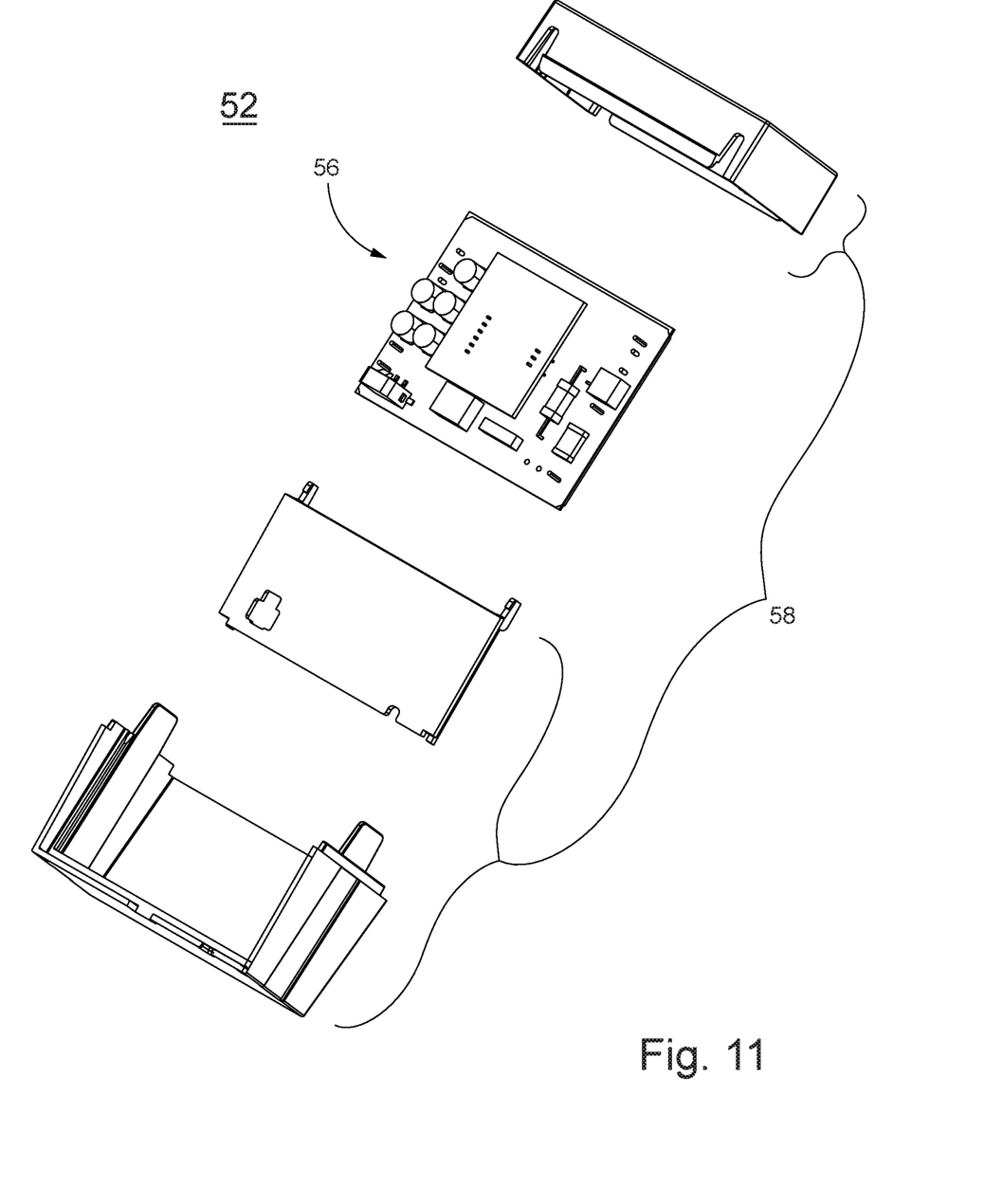
FIG. 11 is an exploded perspective view of the power supply that energizes the wireless power transmitters.

Power unit 10 further includes a power supply 52 for supplying electrical power from a power infeed (such as a traditional high voltage AC power cord 54) to each wireless power transmitter 22. In the illustrated embodiment, power supply 52 is supported at carriage 24 and includes a circuit board 56 (FIG. 11) mounted in a housing 58 that is configured to be supported at an elongate channel member 60 of carriage 24. It is envisioned that housing 58 and channel member 60, and the other components of carriage 24, may correspond or may be substantially similar to components that are more fully described in commonly-owned U.S. Pat. Nos. 9,312,673; 8,444,432; and 8,480,429, all of which are hereby incorporated herein by reference in their entireties.

In the illustrated embodiment, the upper region 16b of housing 16 includes an upper bezel 62 that is configured to rest atop a work surface as the remaining portions of housing 16, cover 18, and carriage 24 extend below the work surface. Top panel 38 of cover 18 may be substantially flush with bezel 62 when cover 18 is closed, so that top panel 38 is positioned just above the work surface when cover 18 is closed. Bezel 62 defines a rectangular opening in which cover 18 is received when the cover is closed, and in the illustrated embodiment, bezel 62 and cover 18 are sized so that an elongated gap 64 is formed or defined between forward portion 18b of cover and a forward portion 62a of bezel 62. Gap 64 permits cords to exit cavity 26 when cover 18 is closed, such as to permit continuous usage of power receptacles 12, 14. Gap 64 also permits light emitted from lamp units 30 to be either directly viewed by a user positioned near a front region of the power unit 10, or to be indirectly viewed when light reflects off of the bezel's forward portion 62a and/or a forward sidewall 36 of cover 18, and/or internal surfaces inside cavity 26. Optionally, lamp units may be positioned elsewhere in the electrical power unit 10, such as in the bezel's forward portion 62a adjacent the elongate gap 64, or along housing 16 inside recess or cavity 26, for example.

Although electrical power unit 10 is primarily shown and described as being a device for mounting in an opening formed in a work surface, it will be appreciated that the principles of the present invention may be carried out in a freestanding unit or in a unit that is mounted at or near a horizontal work surface, a wall divider, or in other applications, without departing from the spirit and scope of the present invention.

Thus, the electrical power unit of the present invention enables convenient wireless/contactless charging of compatible portable electronic devices along a work surface, and provides active feedback to a user confirming that their device is receiving power from the electrical power unit. The electrical power unit includes one or more wireless power transmitters in a movable cover or lid, which can be raised to provide access to an interior of the electrical power unit. The active feedback may be in the form of an electric lamp associated with each wireless power transmitter, which lamp is either directly visible to a user from a vicinity of the electrical power unit, or which illuminates or directs light onto a surface of the electrical power unit that is visible to a user even when the power unit's cover is closed.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. An electrical power unit configured to be positioned along a work surface, said electrical power unit comprising:
    a stationary housing;
    a cover movably coupled to an upper region of said stationary housing, said cover defining a cover interior, and said cover having a rear portion and a front portion opposite said rear portion, wherein said cover is movable from a closed position to an open position;
    wherein said front portion of said cover cooperates with said housing upper region to define an elongate gap configured to permit electrical cords to pass between said cover and said housing upper region when said cover is in the closed position;
    at least one electrical or data receptacle supported at said stationary housing and spaced below said cover, wherein said at least one electrical or data receptacle is accessible when said cover is in the open position;
    a wireless power transmitter disposed in said cover interior and configured to provide wireless electrical power at or above an upper surface of said cover; and
    a lamp unit disposed in one of said stationary housing and said cover, in a location spaced from said gap, and aimed so that light emitted from said lamp unit is directed into said gap and reflected off of at least one of said housing upper region and said front portion of said cover, wherein the light directed into said gap is indirectly visible from outside said electrical power unit when said cover is in said closed position;
    wherein said wireless power transmitter is configured to selectively illuminate said lamp unit when said wireless power transmitter is energized.

2. The electrical power unit of claim 1, wherein said at least one electrical or data receptacle comprises at least one direct-contact high voltage AC receptacle and at least one low voltage DC receptacle.

3. The electrical power unit of claim 1, wherein said rear portion of said cover is pivotably coupled to said stationary housing, whereby said cover is pivotably movable from said closed position to said open position.

4. The electrical power unit of claim 1, wherein said lamp unit is disposed in said interior region at said front portion of said cover.

5. The electrical power unit of claim 4, wherein a front edge of said front portion of said cover comprises an aperture or translucent region through which said lamp unit is visible when illuminated.

6. The electrical power unit of claim 1, wherein said wireless power transmitter is operable to detect when a compatible power receiver is positioned within transmission range of said wireless power transmitter, and wherein said wireless power transmitter is configured to illuminate said lamp unit only when the compatible power receiver is positioned within the transmission range of said wireless power transmitter.

7. The electrical power unit of claim 1, wherein said wireless power transmitter is a contactless power transmitter.

8. The electrical power unit of claim 1, comprising at least two of said wireless power transmitters in spaced arrangement in said cover interior, and comprising at least two of said lamp units corresponding to respective ones of said wireless power transmitters.

9. The electrical power unit of claim 8, wherein said at least two wireless power transmitters are independently energizable.

10. The electrical power unit of claim 1, wherein said stationary housing defines a cavity below said cover, wherein said at least one electrical or data receptacle is accessible in said cavity only when said cover is in said open position.

11. An electrical power unit configured to be positioned along a work surface, said power unit comprising:
    a housing defining an interior cavity;
    a cover pivotably coupled to an upper region of said housing and having an upper surface and a lower surface cooperating to define a cover interior, said cover having a front edge portion spaced from said housing to define an elongate gap that provides cord access to said interior cavity when said cover is in a closed position;
    a wireless power transmitter disposed in said cover interior and configured to direct contactless electrical power through said upper surface of said cover; and
    a lamp unit positioned rearwardly of said front edge portion of said cover, wherein said lamp unit is aimed so that light emitted from said lamp unit is directed into said elongate gap and reflected off of said housing and outwardly from said elongate gap, and so that the light is indirectly visible to a user positioned near said power unit when said cover is in the closed position;
    wherein said wireless power transmitter is configured to selectively illuminate said lamp unit when said wireless power transmitter is energized.

12. The electrical power unit of claim 11, further comprising at least one electrical or data receptacle supported at said housing and accessible via said interior cavity.

13. The electrical power unit of claim 12, wherein said at least one electrical or data receptacle comprises at least one direct-contact high voltage AC receptacle and at least one low voltage DC receptacle.

14. The electrical power unit of claim 13, comprising at least two of said wireless power transmitters, wherein said wireless power transmitters are operable to independently detect when a compatible power receiver is positioned within transmission range thereof, and wherein said wireless power transmitters are configured to illuminate respective ones of said lamp units only when the compatible power receiver is positioned within the transmission range of a respective one of said wireless power transmitters.

15. An electrical power unit configured to be positioned along a work surface, said power unit comprising:
- a housing defining an interior cavity and having an open upper region;
- a stationary carriage mounted in a lower region of said housing;
- at least one electrical or data receptacle supported at said stationary carriage;
- a cover mounted in said open upper region of said housing and pivotable between a closed position in which said cover substantially occupies said open upper region of said housing to preclude access to said at least one electrical or data receptacle, and an open position in which said cover is raised out of said open upper region of said housing to provide access to said at least one electrical or data receptacle;
- said cover having an upper panel and a lower panel spaced below the upper panel, wherein said upper and lower panels cooperate to define a cover interior, and said cover having a front edge portion in which a plurality of lamp units are mounted in spaced arrangement, said front edge portion comprising an upper overhang region disposed above said lamp units, with said lamp units positioned rearwardly of said upper overhang region;
- wherein said upper overhang region of said cover cooperates with said housing to define an elongate gap therebetween at said open upper region when said cover is in the closed position;
- a plurality of wireless power transmitters disposed in spaced arrangement in said cover interior and configured to direct contactless electrical power upwardly through said upper panel of said cover; and
- a power supply and voltage converter supported at said stationary carriage and configured to supply electrical power received from a power infeed to each of said wireless power transmitters;
- wherein said lamp units are in electrical communication with respective ones of said wireless power transmitters, and are configured to illuminate independently when respective ones of said wireless power transmitters are energized, wherein light emitted from each of said lamp units is directed laterally from said front portion of said cover and into said elongate gap and outwardly from said open upper region of said housing.

16. The electrical power unit of claim 15, wherein each of said wireless power transmitters is configured to detect when a compatible power receiver is positioned within transmission range thereof, and wherein each of said wireless power transmitters is configured to illuminate a respective one of said lamp units only when the compatible power receiver is positioned within the transmission range of the respective wireless power transmitter.

17. The electrical power unit of claim 15, wherein said elongate gap is configured to provide cord access to said interior cavity when said cover is in the closed position.

18. The electrical power unit of claim 17, wherein said front edge portion of said cover comprises a forward cover sidewall extending upwardly from a forward edge of said bottom panel, said forward cover sidewall defining a plurality of openings corresponding to respective ones of said lamp units.

19. The electrical power unit of claim 15, wherein said cover comprises a central structural cover portion disposed in said cover interior between said upper and lower panels, said central structural cover portion defines a plurality of openings in spaced arrangement, each of said openings configured to receive a respective one of said wireless power transmitters.

* * * * *